Oct. 18, 1938.　　　　O. ONSRUD　　　　2,133,331
MOLDING MACHINE
Filed Jan. 2, 1936　　　　8 Sheets-Sheet 8

Fig. 8

Inventor
Oscar Onsrud
by Rummler Rummler & Woodworth
Attys

Patented Oct. 18, 1938

2,133,331

UNITED STATES PATENT OFFICE 2,133,331

MOLDING MACHINE

Oscar Onsrud, Chicago, Ill., assignor to Onsrud Machine Works, Inc., Chicago, Ill., a corporation of Illinois Application January 2, 1936, Serial No. 57,242

2 Claims. (Cl. 144—134)

This invention relates to machines for making wood molding, dowels, the slats for Venetian blinds, lead pencils and other like products, wherein the stock operated upon is cut lengthwise into various forms or strips.

The purposes of the invention are, to improve machinery for manufacturing articles of the class mentioned, enabling close micrometer adjustments, in all directions, of the cutting tools for a high degree of accuracy in the work and to make compensations for wear of the tools and the sharpening of the tools, for example when a cutter becomes slightly tapered in the sharpening operation it may still be run true to cut grooves of equal depths such as required in the manufacture of pencils; to provide convenience in the matter of operating upon stock of various lengths, including a movable pneumatic feed unit having flexible connections to automatic control devices; to provide for quickly moving the cutting units toward and away from the material operated upon in two directions, and to a large extent without altering the micrometer adjustments; to provide improvements in feeding mechanism and guide devices for insuring the correct movement and absence of vibration of the material operated upon; to provide for the prompt removal of cut away material and to make numerous other provisions in the machine so that it may continuously operate without much attention and maintain accuracy in its products.

The purposes of the invention are accomplished by means of a machine as illustrated in the drawings, wherein—

Fig. 2 is a perspective view taken at the opposite side of the machine to that from which Fig. 1 is taken.

This machine is designed to operate upon wooden slats having a maximum width of about four inches or less and of various thicknesses and lengths. It receives a stack of such slats in vertical guides one of which is shiftable away from the other along an extension table. The slats are successively fed from the lower end of the stack through the machine and between the cutters and are by the cutters grooved above and below, rounded at their edges or otherwise formed according to variations which may be required in the product of the machine. For example if it is forming pencils from strip stock the required hexagonal or round form of the pencil is determined by the type of cutting tools which are carried by the upper and lower cutting units. The upper unit first grooves the material operated upon at its upper side which action is followed by the operation of the lower cutter grooving the under side of the material. These cutters together cut through the stock or only partly into it. Each cutting unit may be adjusted rapidly up and down toward or away from the cutting position a comparatively great distance and very minutely. Each cutting unit including its motor is likewise movable toward and away from the working position sidewise of the machine.

Figure 1:
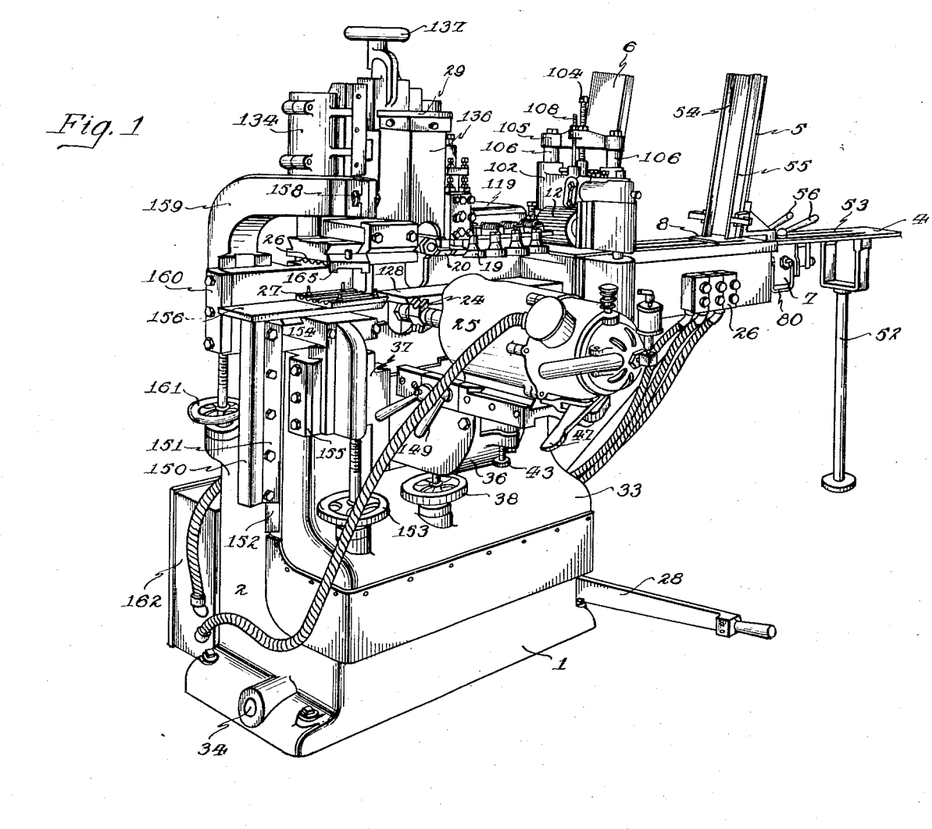
Figure 1 is a perspective view of the machine showing its front side and the discharge end thereof.
Figure 2:
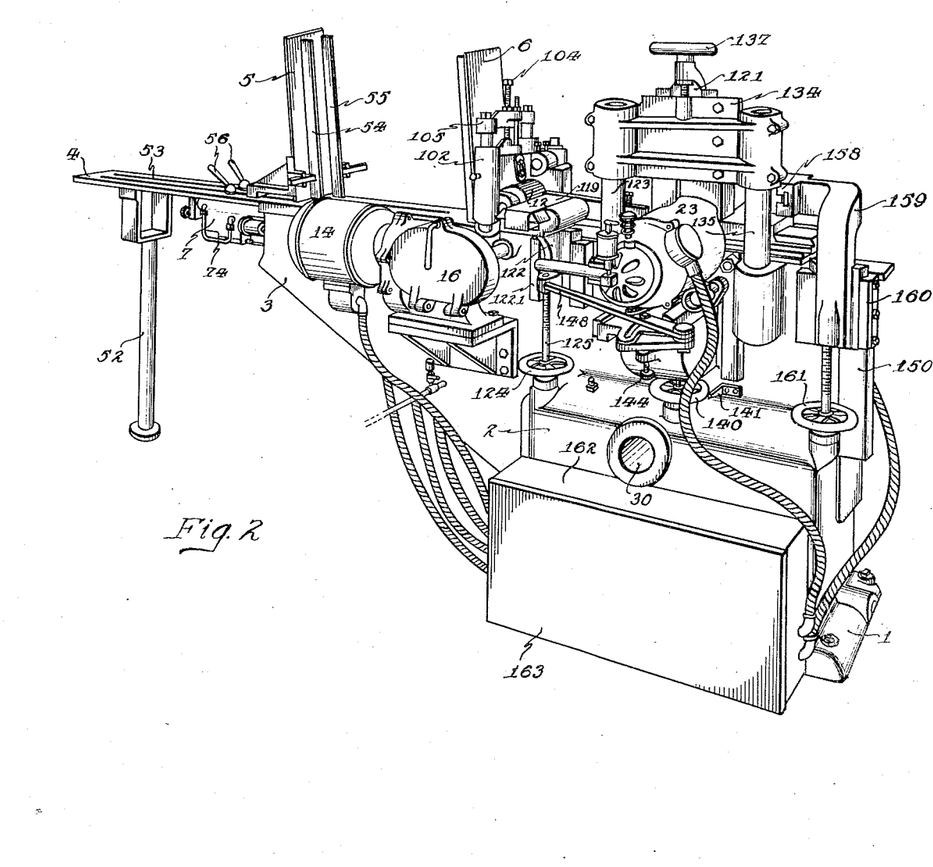

Figures 1 and 2 show the relationship of the principal operating units of the machine and its supporting structure.

The base 1 supports a frame structure 2, which carries at its top a rearwardly extending table arm 3 to which is attached an extension table 4. Parts 1, 2 and 3 are preferably cast integral. A vertical or inclined stock supporting guideway 5 is movable to various positions along the table 4 to coact with a guideway 6 for receiving strip stock of various lengths. Attached to the adjustable guide 5 to move therewith is a pneumatic feed mechanism 7 including the horizontal slide 8, Fig. 9, but without stopping here to describe the feed mechanism it is first desired to point out the main operating units of the machine in the order in which they receive the material operated upon.

Next in order to the feed mechanism which operates slide 8 is the control therefor, comprising triggers 9, starting lever 10 and valve construction 11 operated thereby.

Figures 6, 7:
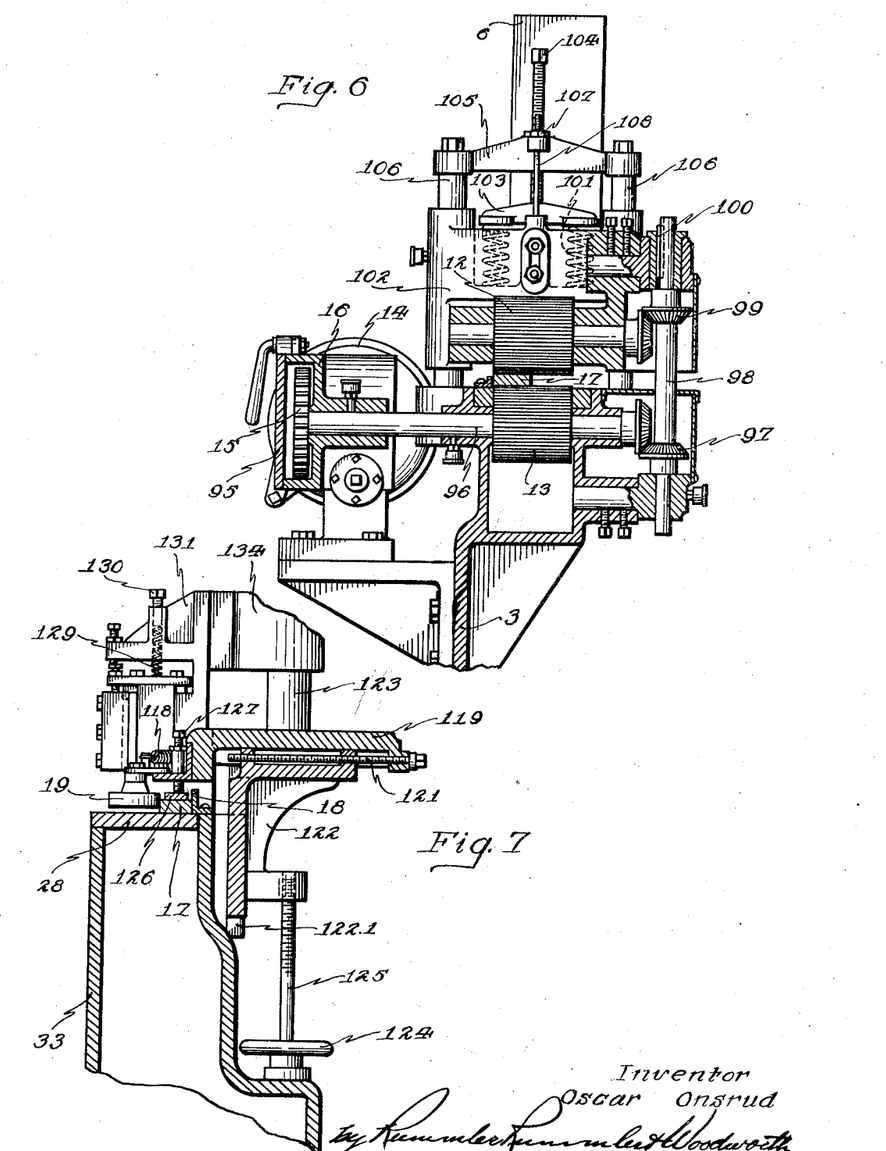
Fig. 6 is a fragmentary sectional view taken on the line 6—6, Fig. 3A, and showing the construction of a stock feeding unit.
Fig. 7 is a fragmentary sectional detail taken on the line 7—7 of Fig. 3A, showing guiding means for the strip stock which is fed through the machine, and means for adjusting the guide device vertically and laterally for accommodating stock of varying dimensions.

Next is a pair of feed rollers 12 and 13 which are ribbed on their surface as shown in Fig. 6. These feed rollers are driven by an electric motor 14 through worm and changeable spur gearing 15 contained within gear box 16.

Figure 3A:
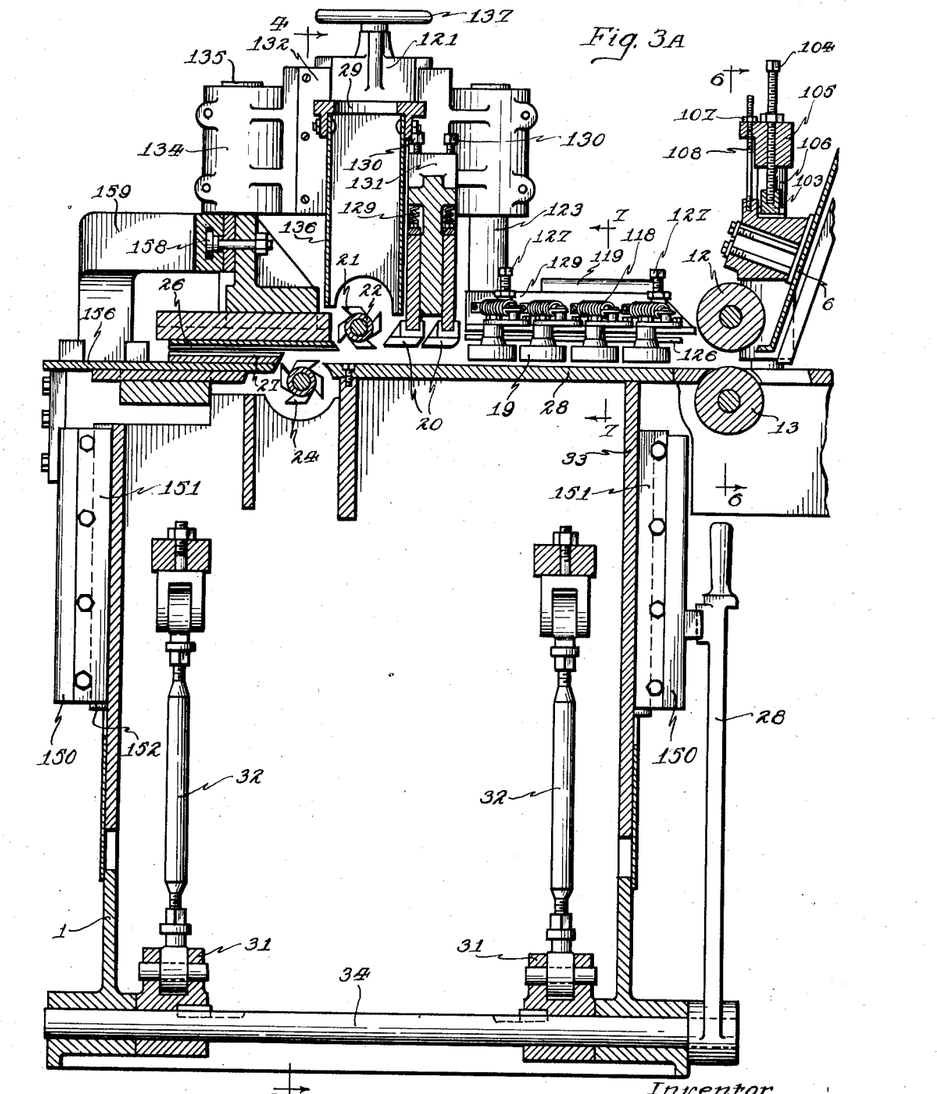
Fig. 3A shows the machine in longitudinal section but partly broken away, the section being taken on the line 3—3 of Fig. 4.

Following the feed rollers 12 and 13 each strip of material such as indicated at 17 slides along guide rail 18 against which it is held by a series of resiliently mounted guide or stock rectifying rollers 19, Fig. 3A, to beneath longitudinally grooved hold down shoes 20 adjacent the first and upper cutter 21. This cutter is carried by spindle 22 which is a continuation of the armature shaft of an electric motor 23, Fig. 4.

Next the stock is operated upon by the lower cutter 24, which is driven by an electric motor 25. The on and off switches for the three drive motors are indicated at 26', Fig. 1. The finished cut articles, such as dowel pins, enter the guide grooves in plates 26 and 27 on leaving the cutters prior to discharge from the machine so that the material is firmly held until the cut is finished. These plates are not separated as indicated in Fig. 1 while the machine is in operation, but the lower plate may be moved down to position indicated in this view, together with the lower cutting unit, by drawing lever 28 forwardly from the position of Fig. 3A and the broken line position, Fig. 4 to the full line position Fig. 1.

Figure 4:
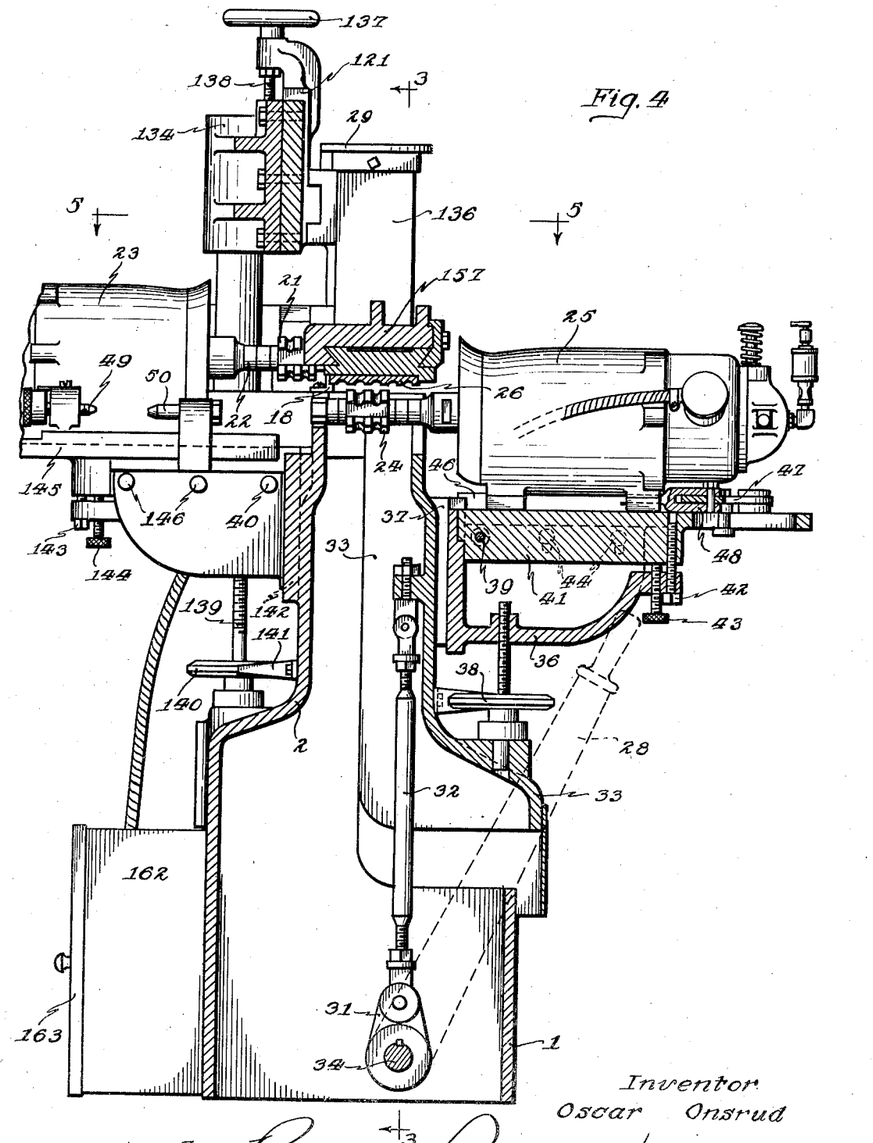
Fig. 4 is a transverse vertical section taken on the line 4—4 of Fig. 3A.

The shavings from the cutters are continuously removed while the machine is in operation, by air suction devices attached to the machine at the air outlets 29 and 30, Figs. 4 and 1, but in case of faulty stock or a collection of wood fragments interfering with the operation of the machine, there is a decided convenience in having the lower cutting unit movable downwardly away from its cutting position. This is provided for by having lever 28, Figs. 3A and 4, rigid with cranks 31, which operate the extensible links 32 having connection at their upper end with the structure 33 upon which the lower cutting unit is mounted. This elevator member 33 has a top plate face normally contiguous with the horizontal guide face on the main table part at the intake end (Fig. 3A).

The shaft 34 which carries cranks 31 has its bearings in frame 2 and this frame has the guides 35 for the movable frame structure 33. The bracket 36 which carries the motor is further vertically slidable on the guideways 37 on the movable frame 33 by means of a hand wheel 38.

Another feature of the cutting units and one of the general characteristics of this machine is that the motors are tiltable on hinge bolts 39 and 40 (Fig. 4) in order that they may be trued up horizontally or slightly tilted to compensate for taper in the cutters. A tiltable support for the right-hand motor (Fig. 4) is indicated at 41, adjusting screw and locking screws at 42, 43 and 44.

The motor frame may also be drawn outwardly along guides 45 and 46 (Fig. 5) on the support 41 by means of a lever 47 and link connection 48 to the motor frame.

Thus the tool 24 may be easily reached and replaced. The inward motion of the cutting unit is limited by a micrometer screw 49 coacting with stop 50 and clamps 51 are used for locking the unit in the operating position. A similar adjusting screw 49 and stop 50 are used for the cutting unit 21 (Fig. 4) which operates on the upper surface of the stock.

The foregoing description mentions the general arrangement and some of the principal mechanical features of the machine. The following is detailed description of various operating units thereof, beginning with the feed mechanism illustrated by Figures 3B, 8 and 9.

*Feed mechanism*

The table 4 forms a detachable extension of the arm 3 (Fig. 1) which is a part of the main frame structure 2. The extension 4 may be much longer than is indicated in the drawings according to the length of the stock which is to be operated upon. The outer end of extension 4 is supported by a post 52. Slidable along ways 53 in the extension 4 is guide channel 5. Channel 5 has fixed flange 54 and an adjustable flange 55 (Fig. 1), which arrangement is also used for the guide channel 6.

The strips of stock which are to be cut to form are placed between the channels 5 and 6, the flanges of the channel serving to retain the stock against lateral displacement. The channel 5 is adjustable along the table support 4 according to the length of the stock and is fastened against displacement by clamps 56. The slide frame 57 to which channel 5 is secured supports the pneumatic feed mechanism 7 which therefore is slidable along the extension table 4 with channel 5. The pneumatic feed mechanism 7 is connected with the fixed valve housing 11 by flexible tubes 58 and 59.

Figure 8:
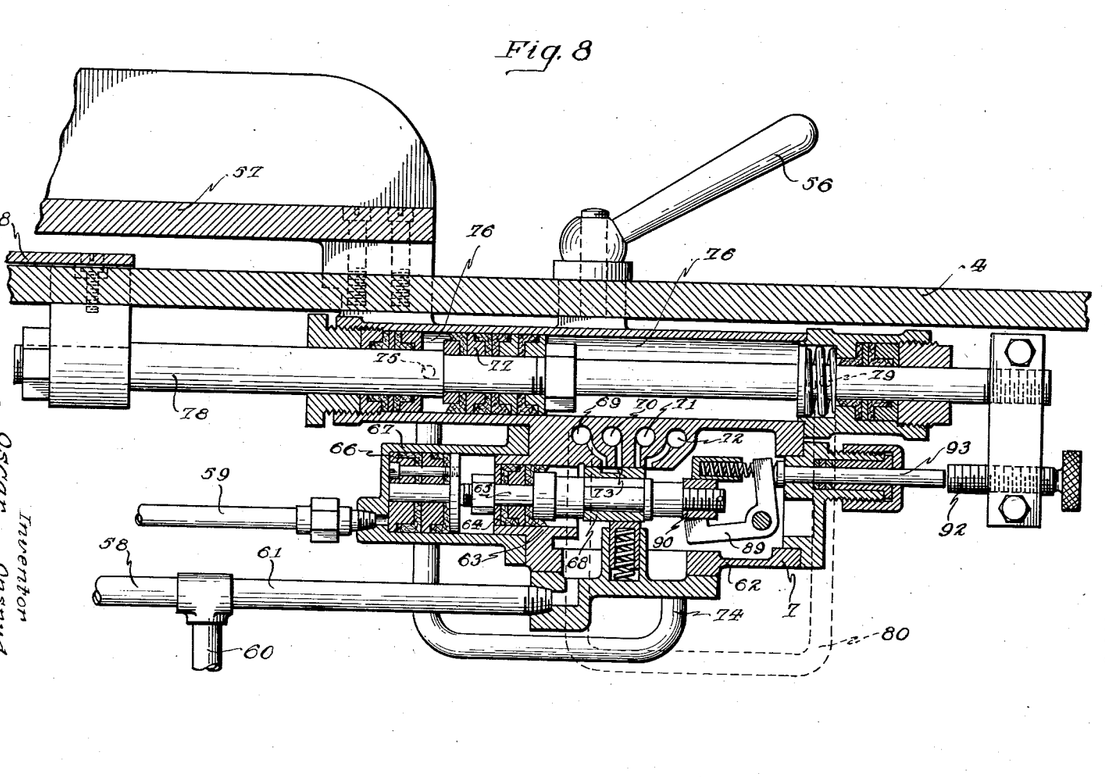
Fig. 8 shows in longitudinal section pneumatic feeding mechanism.
Figure 9:
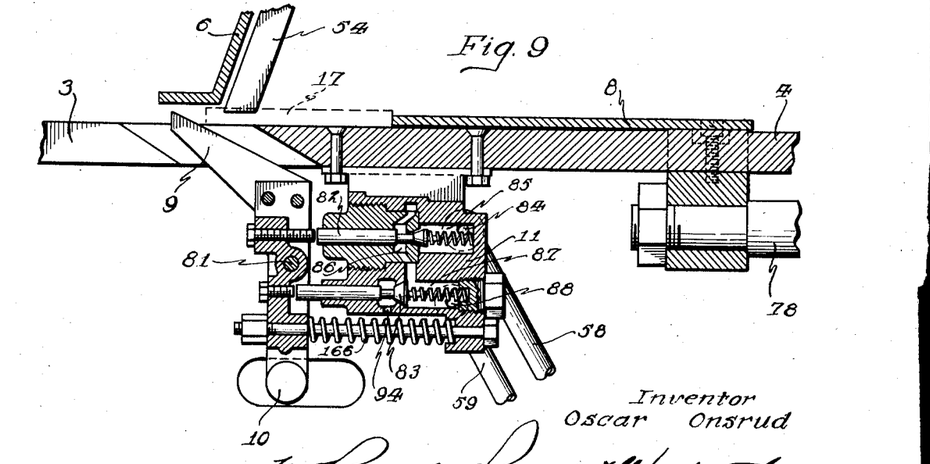
Fig. 9 is a fragmentary longitudinal section which continues Fig. 8 to include valve control means for the pneumatic feed.

Figs. 8 and 9 show the feed mechanism as it would appear after the last piece of stock in the magazine therefor has passed through the machine. The triggers 9 then project through the table arm 3.

Air under pressure is supplied to the feed mechanism by conduit 60. This conduit has a branch 61 leading to a hollow casting 62 (Fig. 8). Formed within the casting 62 is a cylinder 63 within which fits a piston 64. The piston at its right-hand end is subject to the pressure within the casting and is thus normally forced toward its left-hand position as shown in Fig. 8.

Also supported upon piston rod 65 is a piston 66 of larger diameter. This piston slides within a cylinder 67 attached to the casting 62. Because of a larger area for piston 66, both pistons and the rod 65 to which they are fastened may be driven to the right when air at the same pressure as the air within casting 62 is admitted to the cylinder 67 through conduit 58. The piston rod 65 also carries a slide valve 68 controlling the four ports 69 to 72 inclusive.

With the valve in its left-hand position as shown, port 72 is opened, port 71 is closed and ports 69 and 70 are in communication at the point of a recess 73 in the valve.

Under such condition the pressure within casting 62 is communicated to port 72 and the latter is connected by a U-shaped conduit 74 with a port 75 in a cylinder 76 and located to the left of piston 77. The piston 77 is clamped on a piston rod 78 to which is secured the stock feeding slide 8.

Accordingly as soon as air is admitted to the supply conduit 60, the piston 77 is projected to the right end of the cylinder 76 (Fig. 8) carrying with it slide 8 which permits the slats to drop in guides 5 and 6 so that when the piston is projected to the left, the lowermost slat will be forced over into position to be engaged by the feed rollers 12 and 13. To cause the piston 77 to make the feed stroke toward the left, it is necessary to admit air under pressure to the right end of cylinder 76. The air is so admitted through a port 79 which, by conduit 80 shown in Fig. 2 as bent into U-form, communicates with port 69. This port as shown in Fig. 8 is cut off from the air supply within the hollow casting 62, by valve 68. The valve in this position connects port 69 with exhaust port 70. Therefore, to cause a feed stroke of piston 77 it is necessary to shift the valve 68 to the right so as to uncover port 69 and close port 70. This can take place when the triggers 9 are up as shown in Fig. 9. At such time valve 82 is held open and valve 83 is closed.

The air pressure in conduit 58 is communicated to conduit 59 through the passageways 84, 85, 86, 87 and 88 in the valve body. Conduit 59 as shown in Fig. 8 transmits the air pressure to the large area piston 66 and thus the valve 68 is shifted to uncover port 69, cover exhaust port 70, and connect exhaust port 71 with port 72.

When ports 71 and 72 are in communication the air in cylinder 76 to the left of piston 77 exhausts through the conduit 74 to port 72 then in communication with the exhaust port 71.

When the valve construction 68 is thus shifted to the right Fig. 8, it is momentarily retained in that position by the dog 89, which springs over the end of nut 90 on the end of the piston rod 65. The dog releases at the end of power stroke of piston 77 when trip 92 at the right hand end of the piston rod 78 engages plunger 93. During the power stroke of piston 78 the strip of stock 17 holds the triggers 9 down. At that time valve 82 is closed and valve 83 is open. This permits the air under pressure between piston 66 and the head of cylinder 67 to exhaust through conduit 59 to the exhaust port 94 controlled by valve 83. The feeding operation is continuous and automatic so long as the triggers 9 are alternately depressed and released by the stock passing thereover. If the magazine formed by guides 5 and 6 becomes emptied, the operation of the feeding mechanism stops, then, when the supply is replenished, the feed will not again take place until an operator first manually causes a depression of triggers 9 by swinging the handle 10 which projects through the side of the machine.

The corrugated feed rollers 12 and 13 which receive the strips of stock fed from the bottom of the magazine are continuously driven by motor 14, which is connected through the necessary gearing in the casing 16, Fig. 6, with the roller 13. The casing 14 has a hinged cover 95 to provide access to the gears 15 for speed changing purposes.

Figure 3B:
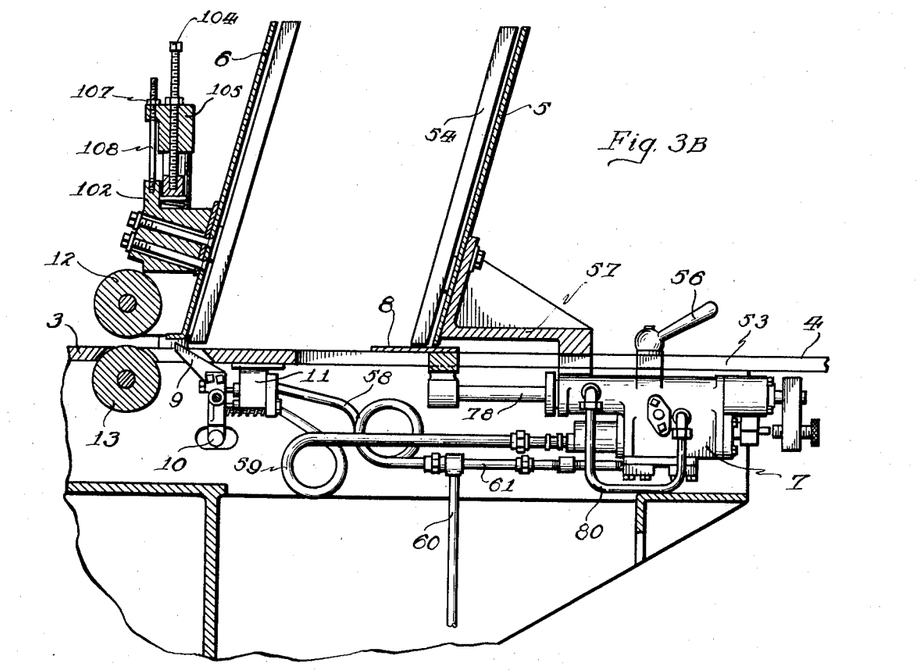
Fig. 3B is a fragmentary continuation of Fig. 3A.

The shaft 96 to which feed roller 13 is secured, through the beveled gearing 97, drives a vertical shaft 98 to transmit motion through beveled gearing 99 to the feed roller 12. The spline 100 allows for up and down adjustment of the feed roller 12 without interfering with the drive connection. Feed roller 12 is pressed down upon stock 17 by springs 101, which act between the bearing element 102 for roller 12 and an abutment 103 which is adjustable by means of screw 104 passing through the fixed frame structure 105. This frame is on the vertical guide shafts 106 for the roller bearing 102. Downward motion of feed roller 12 is limited by a nut 107 carried by rod 108 passing through an ear on frame member 105 and secured at its lower end to the bearing 102. The guide channel 6 as shown in Fig. 3–B is carried by the bearing construction 102 being secured thereto by bolts.

The material leaving rollers 12 and 13 is guided along said guide rail or fence 18 (Fig. 7) by side pressure rollers 19. The springs 118 resiliently urge the rollers 19 into engagement with the stock. The stock rectifying rollers 19 are carried by a slide 119, which may be adjusted sidewise in the guides 120 by screw 121. The frame structure 122 which carries the guides 120 is adjustable vertically along the fixed guide 122.1 by hand wheel 124, which is fast to the threaded shaft 125 extending upward from the immovable frame structure 2. A guide plate 126 for engaging the top of the stock is carried by slide 119 through screws 127 and the stock is held between the plate 126 and a platen 128, Fig. 3A, which is movable up and down with the frame 33, Fig. 1, which carries the lower cutting unit.

The hold down shoes 20 previously mentioned, Fig. 3A, are located adjacent the cutter 21 which operates upon the upper surface of the stock. These shoes are resiliently held in engagement with the work by springs 129, adjustment of which is effected by screws 130 in the vertical slide support 131 for the shoes.

Figures 5, 10:
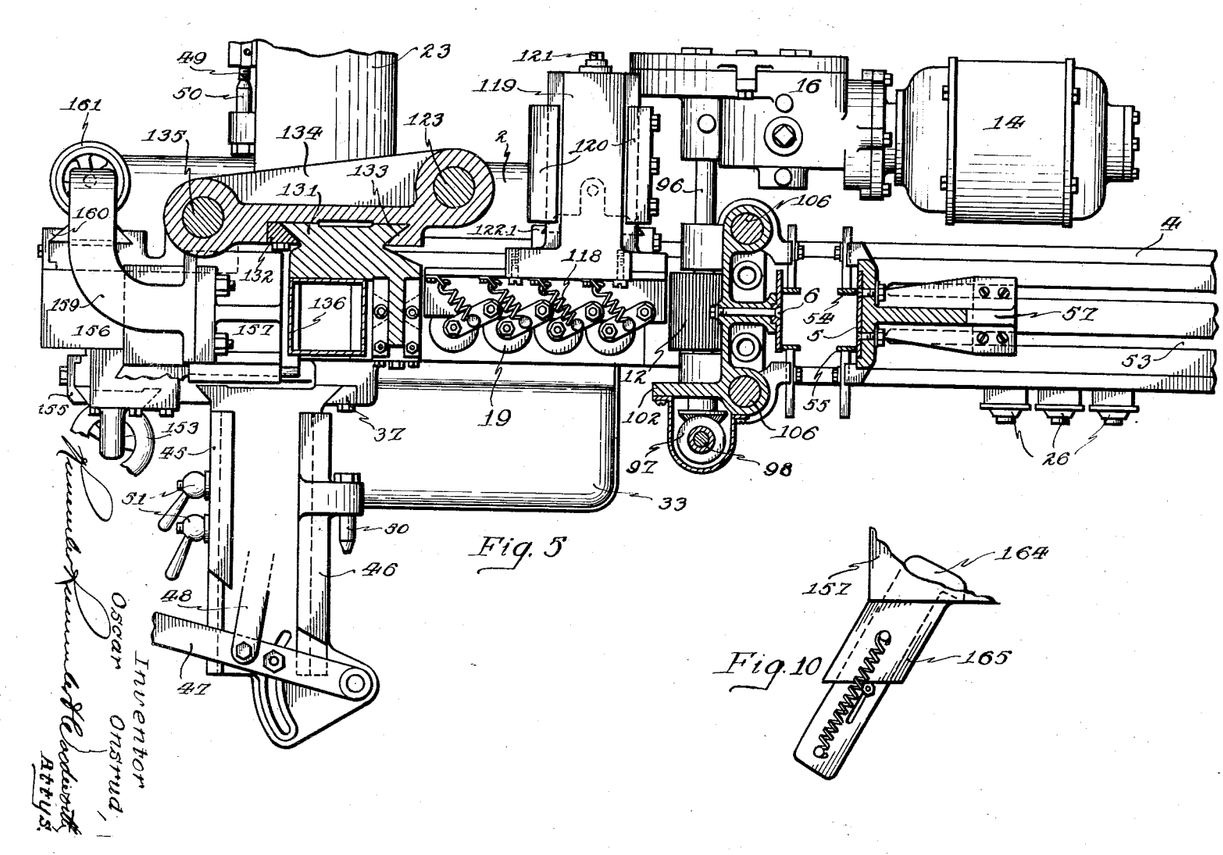
Fig. 5 is a fragmentary plan view of the machine, and partly in section, as indicated by the line 5—5 on Fig. 4.
Fig. 10 is a modification view showing a guide element for engaging the sides of molding strips and like products to steady them as they leave the cutters and are discharged from the machine.

The support 131 is retained in adjusted position by clamping gib 132, Fig. 5, which holds it in a guide channel 133 in casting 134 which is clamped to the fixed posts 123 and 135. The vertically adjustable support 131 also carries the conduit 136 through which material cut away from the stock operated upon is expelled by blower means having attachment to the outlet fitting 29. The adjustment of slide 131, and with it the shoes 20, is effected by hand wheel 137 on the top of screw 138, coacting with casting 134.

*Cutting units*

The upper cutting unit 21 (Fig. 4) which cuts the upper surface of the stock is adjusted downwardly to the cutting position by screw 139 for which purpose the screw is provided with a hand wheel 140 having micrometer markings on its periphery which are indicated by the pointer 141. This unit slides in guideways 142 on the main frame structure 2.

The upper cutter 21 is leveled with reference to the stock operated upon or set at an angle thereto by means of screws 143 and 144 which swing the motor support 145 on the pivot 40.

The lock screws 146 retain the motor support 145 in its adjusted position. These screws pass through slots 147 in the support to allow for its angular adjustment. The upper motor 23 and cutter thereon are moved laterally away from the work by means of hand lever 148 (Fig. 2) which is connected to the motor frame by a link so that it may slide the motor sidewise within the ways provided for by the motor support 145. The motor support is locked when the cutter is in working position by clamps 149.

The lower cutting unit 24 on the front side of the machine has similar adjustments which permit it to be shifted sidewise away from the work by means of lever 47 (Fig. 5) and to be tilted by the screws 42 and 43, and to be vertically adjusted by means of the micrometer screw wheel 38 to regulate exactly the depth of cut; but is likewise movable as a unit a comparatively long distance downwardly through operation of lever 28. In that case the platen 128 (Fig. 1) and the grooved guide 27 move down with the lower cutting unit.

This provides for free access to the work in any stage of the operation thereon by stopping the machine and swinging lever 28 forwardly. The guides for the frame structure 33 which carries the front cutting unit, platen 128, and the guide block 27, are indicated at 150 and include clamping gibs 151 engaging the angle rail or dovetail slide 152, carried at the sides of frame 33.

The grooved guide block 27 may be finely adjusted vertically with reference to the structure 33 by means of wheel 153 whereby the support 154 for block 27 is moved in the guides 155. Guide block 27 is carried by a plate 156 which may be adjusted lengthwise of the machine by a dovetail connection with the support 154.

The upper grooved guide 26 is likewise adjustable lengthwise along its dovetail connection with its support 157 (Fig. 4) and the latter may be adjusted sidewise along the T-slot 158 (Fig. 2) in the supporting casting 159 therefor. The casting in turn is mounted for vertical adjustment along the fixed guides 160 and by means of a hand wheel 161.

The operator has control of the three driving motors through the switch buttons 25. The necessary relays and other automatic electrical control devices are housed within a casing 162 at the rear of the machine and provided with cover 163, (Fig. 2).

Fig. 10 is a detail to illustrate provision for a different type of guide device than that indicated by the numeral 27. For example, when the machine is used for cutting moldings, a side guide is used in place of member 27 and this guide 164 is adjusted along the diagonal way 165, (Fig. 1).

Operation

The machine is intended for very accurate, high-grade productions and is so constructed to afford quick access to various operating elements thereof and the material passing through the machine and without interfering with any of the fine adjustments. Thus if there is reason to reach the work in process, lever 28 may be drawn forwardly and in this way lower the vertical slide frame structure 33, together with the front cutting unit, platen 128 and the guide 27. The micrometer setting of the tool or guides is not necessarily changed. Likewise the cutting units may be shifted sidewise away from the work by means of the levers 47 and 148 but when returned to working position, will be stopped according to the setting of screws 49 and 50.

In using the machine, the strip stock is fed thereto through the guide channels 5 and 6 and although all of the motors may be in operation, the automatic feed of the stock does not begin until the operator swings the arm 10 (Fig. 3B) to the right. This results in the depression of triggers 9 which, in turn, results in adjustment of the valves 82 and 83 and the starting of the pneumatic feed mechanism for reciprocating slide 8 which is illustrated in Fig. 8.

The operation of this feed mechanism is automatic, so long as stock continues to feed downwardly in the channels 5 and 6. The reciprocation of the slide plate 8 successively acts on the strips of stock in the magazine and feeds the lowermost one to rollers 12 and 13.

The downward swinging of the triggers 9 allows air from the left-hand end of cylinder 67 to exhaust by valve 83 through the outlet port 94. Thus the pressure of air from the supply conduit 60 is effective within the hollow casting 62 to drive the pistons 64 and 66 to the left (Fig. 8) and position slide valve 68 as shown in this figure. In this position of the valve air may pass through the port 72 into the conduit 74 to the left of piston 77 through the port 75. Piston 77 and feed slide 8 are thus carried to the right.

Upon release of handle 10 (Fig. 9) spring 166 restores the triggers 9 to the position shown in Fig. 9 and thus reverses the setting of valves 82 and 83. Valve 82 is then open and valve 83 closed as shown in this figure.

The compressed air in supply conduit 60 then passes along conduit 58 to the valve chamber 85, past valve 86 and into valve chamber 87 and from there through conduit 59 communicating the pressure to the left end of cylinder 67. Pistons 66 and 65 are then driven to the right against the pressure within the hollow casting 62 and retained by dog 8. The slide valve 68 is thus positioned to cut off port 72 from the chamber formed by casting 62 and connect this port with outlet 71.

Thus the air may exhaust from the left-hand end of cylinder 76 while the compressed air enters port 69 and from there is conducted by conduit 80 and port 79 to the right-hand end of cylinder 76. Piston 77 is thus driven to cause a feed stroke of plate 8. At the end of the stroke, screw 92 engages plunger 93 and trips the dog 89.

Piston rod 65 is then free to shift to the left and does so as soon as the strip of stock engages the triggers 9 when the valves 82 and 83 are again reversed, permitting the air from the left of cylinders 67 to exhaust through conduit 59 and outlet port 94. This cycle of operation is continuously repeated so long as there is a supply of stock within the magazine formed by guides 5 and 6.

The feed rollers 12 and 13 are driven continuously, forcing the stock along the guiding and steadying devices previously described and consisting of side rollers 19, pressure plate 127 and the hold-down shoes 20, all cooperating with the platen 128 and fence 18 to prevent vibration or incorrect travel of the stock during the operation of the cutters 21 and 24, (Fig. 3A).

The finished articles or formed molding, when leaving the cutters pass between the guiding devices 26 and 27 which are specially formed according to the nature of the product and steady the same while the cutters complete their work. The unfinished articles eject the finished ones from the left end of the machine, Fig. 1.

I claim:

1. A molding machine of the kind described comprising a frame, a guideway therein, means to feed stock to be operated upon along said guideway, cutters oppositely mounted adjacent said guideway one before the other to operate on opposite sides of the stock as it passes said cutters, means to vary and adjust convergence of said cutters relative to the path of the stock, and setting means for tilting the cutters respectively to adjust positioning of the cutting edges relative to the work and to compensate for cutting edge wear, said cutters having supports tiltably mounted on horizontal axes transverse of the cutter, axes toward the inner ends, and said supports having upwardly operating screw means to raise the supports toward their outer ends and so adjust the cutter tilt.

2. An automatic wood molding machine of the kind described comprising a frame, a guideway therein, a stock feed hopper at the supply end of said guideway, pneumatic means to feed stock therefrom to be operated upon along said guideway, independently motorized rotary cutters oppositely mounted adjacent said guideway one before the other to operate on opposite sides of flat parallel faced stock as it passes said cutters, means to vary and positively adjust convergence of said cutters both vertically and horizontally relative to the path of the stock, and setting means for tilting the cutters respectively to adjust and maintain horizontal positioning of the cutting edges relative to the work and to compensate for tool edge wear.

OSCAR ONSRUD.